United States Patent [19]

Dirks et al.

[11] Patent Number: 5,112,585
[45] Date of Patent: May 12, 1992

[54] PROCESS OF REMOVING FLUE GAS CLEANING RESIDUES DURING THE WET CLEANING OF FLUE GASES BY DRYING AND CONSTRUCTION

[75] Inventors: Friedrich Dirks, Gondelsheim; Ortwin Batsch; Wilhelm Hempelmann, both of Leopoldshafen; Hans Leibold, Ettlingen, all of Fed. Rep. of Germany

[73] Assignee: Kernforschungszentrum Karlsruhe GmbH, Karlsruhe, Fed. Rep. of Germany

[21] Appl. No.: 446,730

[22] Filed: Dec. 6, 1989

[30] Foreign Application Priority Data

Dec. 6, 1988 [DE] Fed. Rep. of Germany ....... 3841009

[51] Int. Cl.⁵ ..................... B01D 47/00; C01B 17/48; C01B 21/20
[52] U.S. Cl. ......................... 423/210; 55/84; 55/228; 422/172; 423/235; 423/240 R; 423/242; 423/244
[58] Field of Search ..................... 55/84, 228; 423/210, 423/240, 242, 244, 285; 422/172

[56] References Cited

U.S. PATENT DOCUMENTS 4,342,574 8/1982 Fetzer ........................... 55/486
4,793,831 12/1988 Dirks et al. ..................... 55/93

FOREIGN PATENT DOCUMENTS 0159760 10/1985 European Pat. Off. .
0252223 1/1988 European Pat. Off. .
2716329 10/1978 Fed. Rep. of Germany .
2928526 1/1981 Fed. Rep. of Germany .
3137359 4/1983 Fed. Rep. of Germany .
2146261 4/1985 United Kingdom .

OTHER PUBLICATIONS

John H. Perry, *Chemical Engineers' Handbook*, Fourth Edition (1963), McGraw-Hill Book Co., pp. 19–59, 19–60.
Heissgasfiltration mit Keramischen Filterelementen bei Temperaturen bis 1000° C. und Drüucken bis 50 bar.

*Primary Examiner*—Wayne A. Langel
*Attorney, Agent, or Firm*—Spencer & Frank

[57] ABSTRACT

A process and apparatus for removing flue gas cleaning residues in a combustion system. The combustion system includes a combustion chamber; a hot gas filter located downstream from the combustion chamber; and washers located downstream from the hot gas filter which employ a washing liquid. The hot gas filter includes filter elements and an inlet chamber located below the filter elements. Contaminants present in flue gas are precipitated in the washing liquid. Then, the washing liquid is neutralized, thereby enriching the washing liquid with salts. Next, the enriched washing liquid is injected into the inlet chamber, whereby the washing liquid evaporates and the salts contained in the washing liquid are deposited on the filter elements where they can later be removed and mixed with ashes from the combustion chamber.

7 Claims, 4 Drawing Sheets

PROCESS OF REMOVING FLUE GAS CLEANING RESIDUES DURING THE WET CLEANING OF FLUE GASES BY DRYING AND CONSTRUCTION

BACKGROUND OF THE INVENTION

The present invention relates to a process of removing flue gas cleaning residues during the wet cleaning of flue gases in a combustion system having a hot gas filter and washers The present invention also relates to an apparatus for implementing the process.

In the operation of typical flue gas cleaning systems, acids and other contaminants present in the flue gas are precipitated in the washing liquid In order to keep the washing liquid functioning and to allow it to be discharged into the environment, the washing liquid is generally neutralized by the addition of a caustic soda solution or lime. This causes the wash water or washing liquid to be enriched in salts. To prevent crystal formation in this water, the salt enrichment must not exceed 22 to 25%. However, the removal of such concentrates poses problems since, due to the contaminants contained therein, only a limited amount of them can be added to normal waste waters.

This is even more of a problem in systems which are used to combust radioactive substances. In such systems, the concentrates can be put into permanent storage in solidified form, but the additional development of secondary waste is considerable. Some known concentrate drying processes have tried to pulverize the material to be dried to the greatest extent possible. However, this still requires an additional drying step which consumes additional energy. Other known processes, such as, for example, vacuum drying or drying by means of infrared or microwaves consume large amounts of energy and require a separate process step. Therefore, there exists a need for a simple process which consumes relatively little energy.

SUMMARY OF THE INVENTION

Therefore, it is an object of the present invention to provide a process and an apparatus for implementing the process which overcomes these drawbacks and permits the evaporation of the aqueous component in concentrates and the drying of the solids in a simplified manner with the aid of the heat of the combustion system itself.

To solve this problem, the present invention provides a process and apparatus for removing flue gas cleaning residues in a combustion system, the combustion system including: a combustion chamber; a hot gas filter located downstream from the combustion chamber; and washers located downstream from the hot gas filter which employ a washing liquid. The hot gas filter includes filter elements and an inlet chamber located below the filter elements Contaminants present in the flue gas are precipitated in the washing liquid. Then, the washing liquid is neutralized, thereby enriching the washing liquid with salts. Next, the enriched washing liquid is injected into the inlet chamber, whereby the washing liquid evaporates and the salts contained in the washing liquid are deposited on the filter elements where they can later be removed and mixed with ashes from the combustion chamber.

Preferably, the salt enriched washing liquid is injected into the inlet chamber by means of a binary spray nozzle which projects into the inlet chamber below the filter elements In addition, the filter elements preferably include outlet openings connected to blow lances which are charged with compressed air for removing the deposited salts.

The present invention provides a simple process and a simple apparatus for this process which use the hot gas filter in the combustion system to dry the concentrat without an additional process step. The nozzle entering into the hot gas filter is easy to manufacture and only requires energy to produce the compressed air for jetting into and blowing back from the filter elements as well as the electrical energy required to transport the concentrate.

Another object of the invention is to dry the salt enriched washing liquid or concentrate on the filter elements and to incorporate the dried salts created thereby in the ashes of the combustion system and in the flue ashes of the filter so that these waste materials can be put together in packets in a simple manner.

While many of the prior art processes require uniform velocities as well as closely defined temperature gradients, in the process according to the invention, it is only necessary to stay below a temperature of about 770° C. Also, the inlet rates as well as the temperature range may be adjusted downwardly as desired An apparatus according to the invention used with a hot gas filter may be installed in almost any combustion furnace or in any heat generating device resulting in corresponding temperatures. Thus, the process according to the invention can also be employed in other procedures than the one described above.

The salt enriched washing liquid, which in expensive prior art processes had to be cemented, bituminized, vacuum dried, etc., can be dried in the combustion system and easily put into a form suitable for permanent storage together with the ashes from the combustion system.

Further details of the present invention will now be described in greater detail with reference to the drawing figures.

DESCRIPTION OF THE PREFERRED EMBODIMENTS

Figure 1:
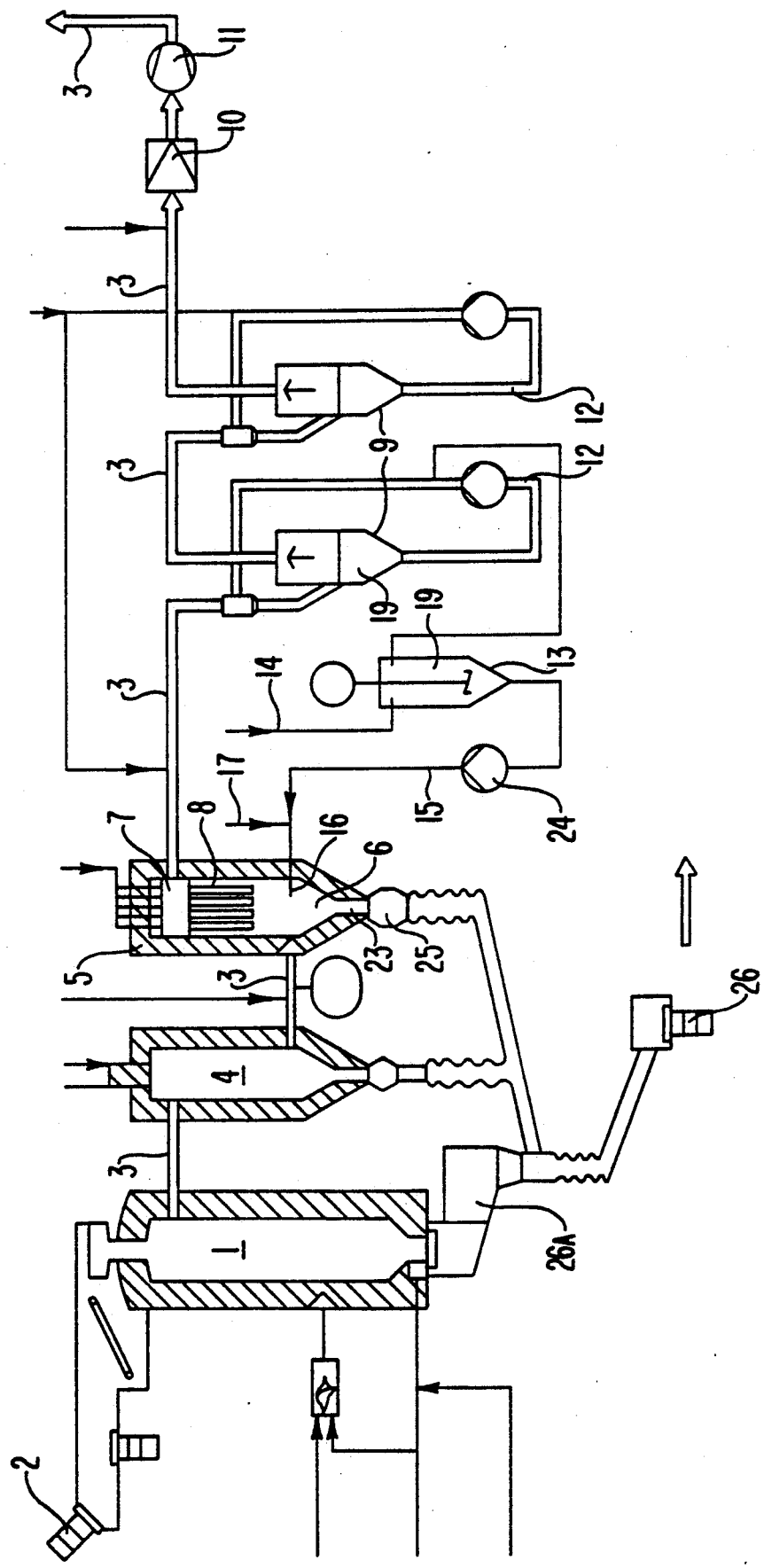
FIG. 1 is a schematic drawing of a combustion system in which the process according to the invention may be employed.

Referring to FIG. 1, flue gas 3 generated in a combustion furnace 1 during the combustion of wastes 2 are heated to about 1200° C. in an afterburner 4 and are conducted into an inlet chamber 6 of a dry hot gas filter 5. Next, flue gas 3 flows from the outside through hollow, cylindrical ceramic filter elements 8. Filter elements 8 like that are produced and available by the SCHUMACHER GmbH & Co. KG of Germany, type SCHUMALIT 20 or SCHUMACEL LITP, 60 millimeters in diameter and 1500 millieters in lenght. The filter elements 8 are mounted in holding openings 31 in a holding plate 30 which separates inlet chamber 6 from an outlet chamber 7 (see FIGS. 2 and 3). After flue gas 3 is filtered, it is conducted through one or more washers 19, which are generally jet washers. The temperature in hot gas filter 5 is generally about 800° C.

Downstream from washers 9, flue gas 3 is heated by air that is mixed in with flue gas 3, so that its temperature prior to entering filters 10 is above the dew point. Filters 10 catch particles suspended in the flue gas. Flue gas 3 is extracted toward the top of the system with the aid of a blower 11.

Washing liquid 19 for washers 9 circulates in a conduit 12. After a certain period of time the washing liquid is neutralized in a mixing device 13 by the addition of neutralizing agent 14 which may be, for example, NaOH. After being neutralized, the washing liquid becomes enriched with salts and is conducted through an injection conduit 15 into a double pipe 16 which projects into inlet chamber 6 (see FIG. 2). The flow of washing liquid is controlled by a metering pump 24. The liquid is put under pressure by injecting compressed air through a conduit 17.

At the end of the double pipe 16, within inlet chamber 6 and below filter elements 8, there is disposed a binary nozzle 18. In nozzle 18 washing liquid 19, introduced through injection conduit 15, is atomized by means of the compressed air introduced through conduit 17 and is sprayed into inlet chamber 6 as a jet of spray 20. The water in jet 20 thus evaporates and the salts carried in the washing liquid are deposited on the surfaces of ceramic filter elements 8. Because they are injected into inlet chamber 6 by means of nozzle 18, the salt particles are enlarged so that clogging of filter elements 8 is prevented.

From time to time, the salt layers disposed on filter elements 8 are removed with the aid of a blow-back device 21 which removes the salt layers from elements 8 and thereby causes the salt layers to drop to the bottom of the inlet chamber 6 and fall through an opening 23. These salt layers or residue have the shape of the exterior of ceramic filter elements 8, i.e. they are in the form of a shell.

Once the salt shells fall through opening 23, they enter a grinder 25 which comminutes the shells into finer particles. The comminuted salts are then combined with ashes from the combustion chamber. The combined salts and ashes then exit out of the system through an outlet 26 for further processing. This processing may include shaping the combined salts and ashes into a more usable form such as a packet.

Figure 2:
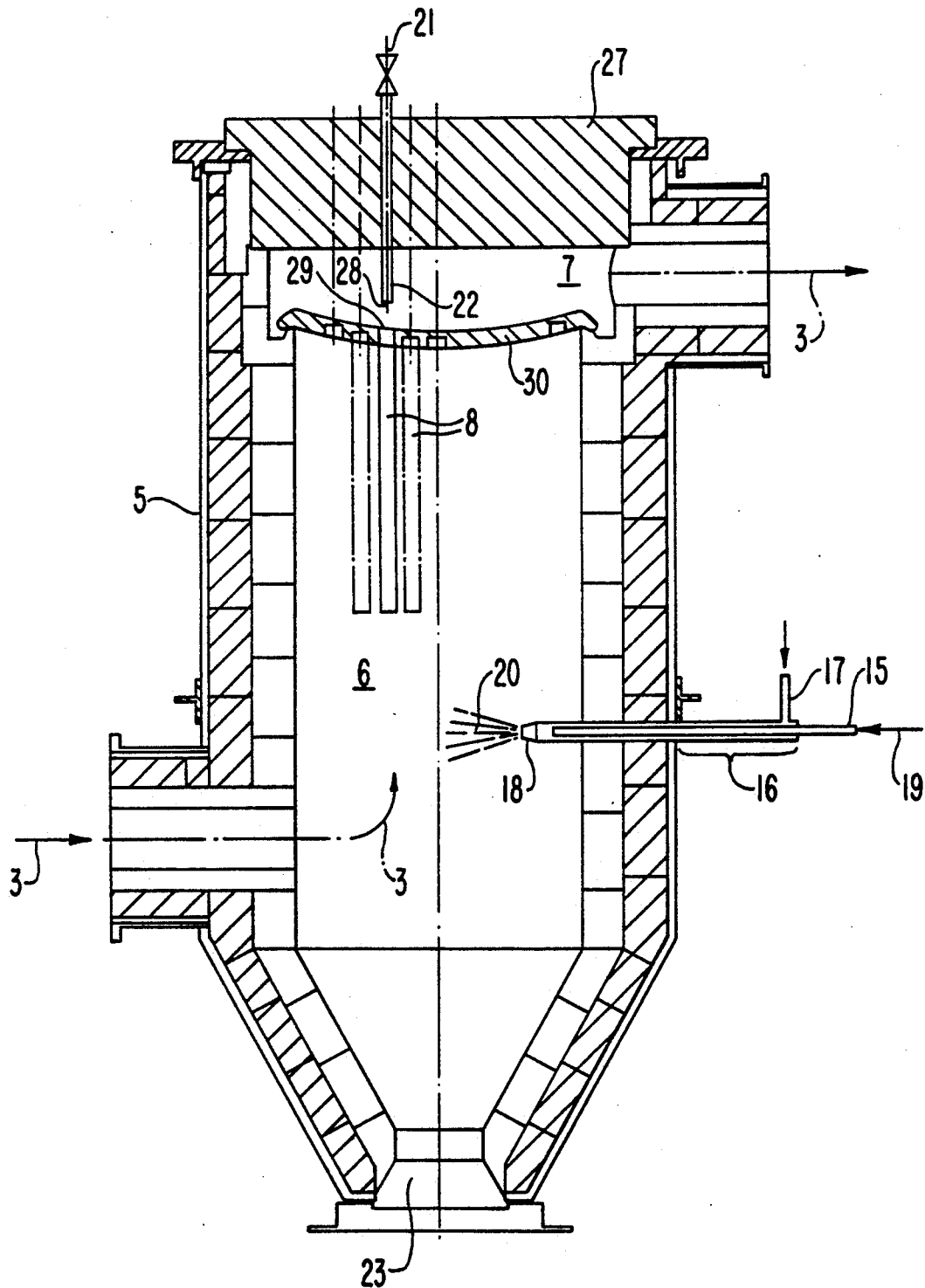
FIG. 2 is an enlarged view of the hot gas filter of the system of FIG. 1.
Figure 3:
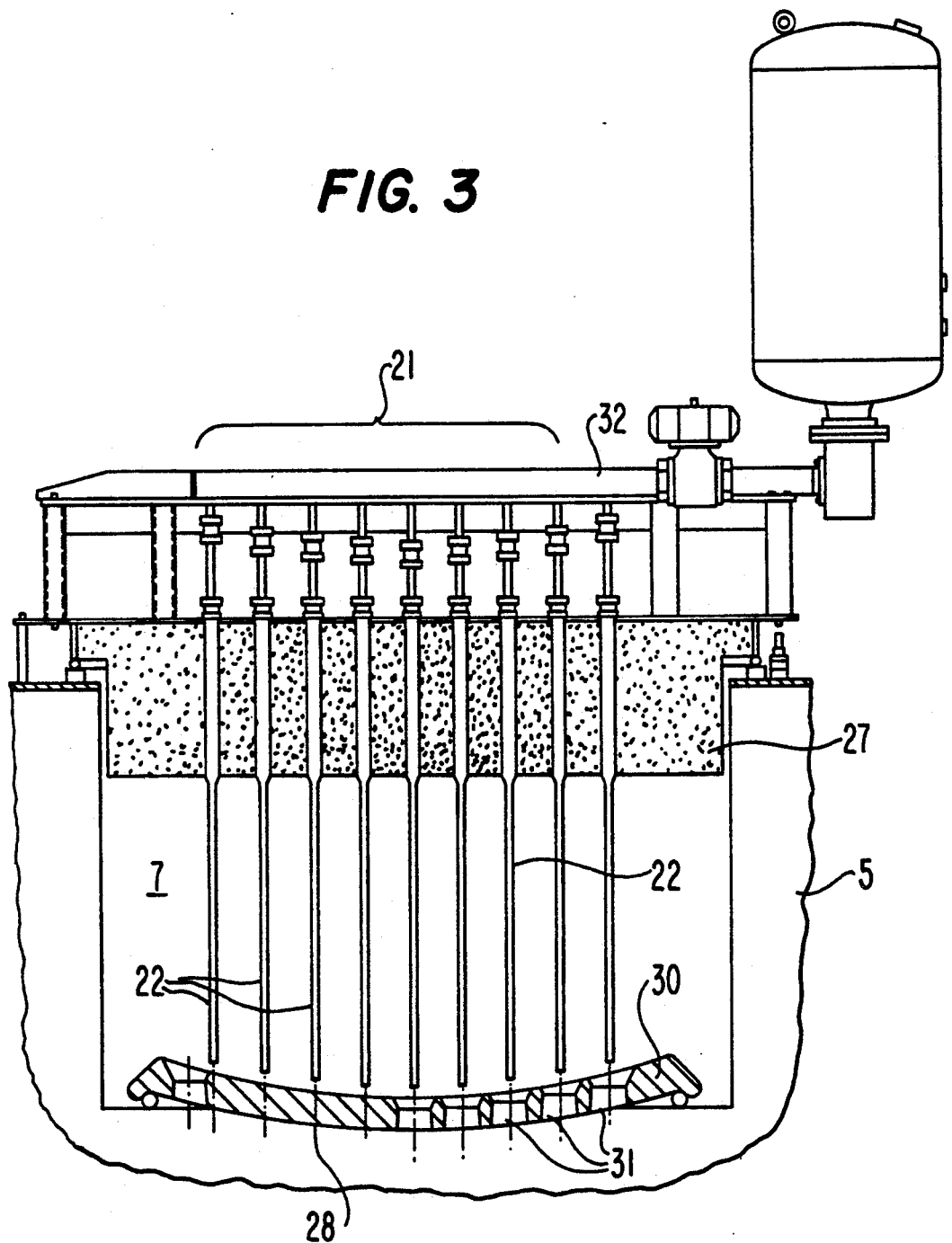
FIG. 3 shows the upper portion of the hot gas filter of FIGS. 1 and 2 together with a blow-back device.
Figure 4:
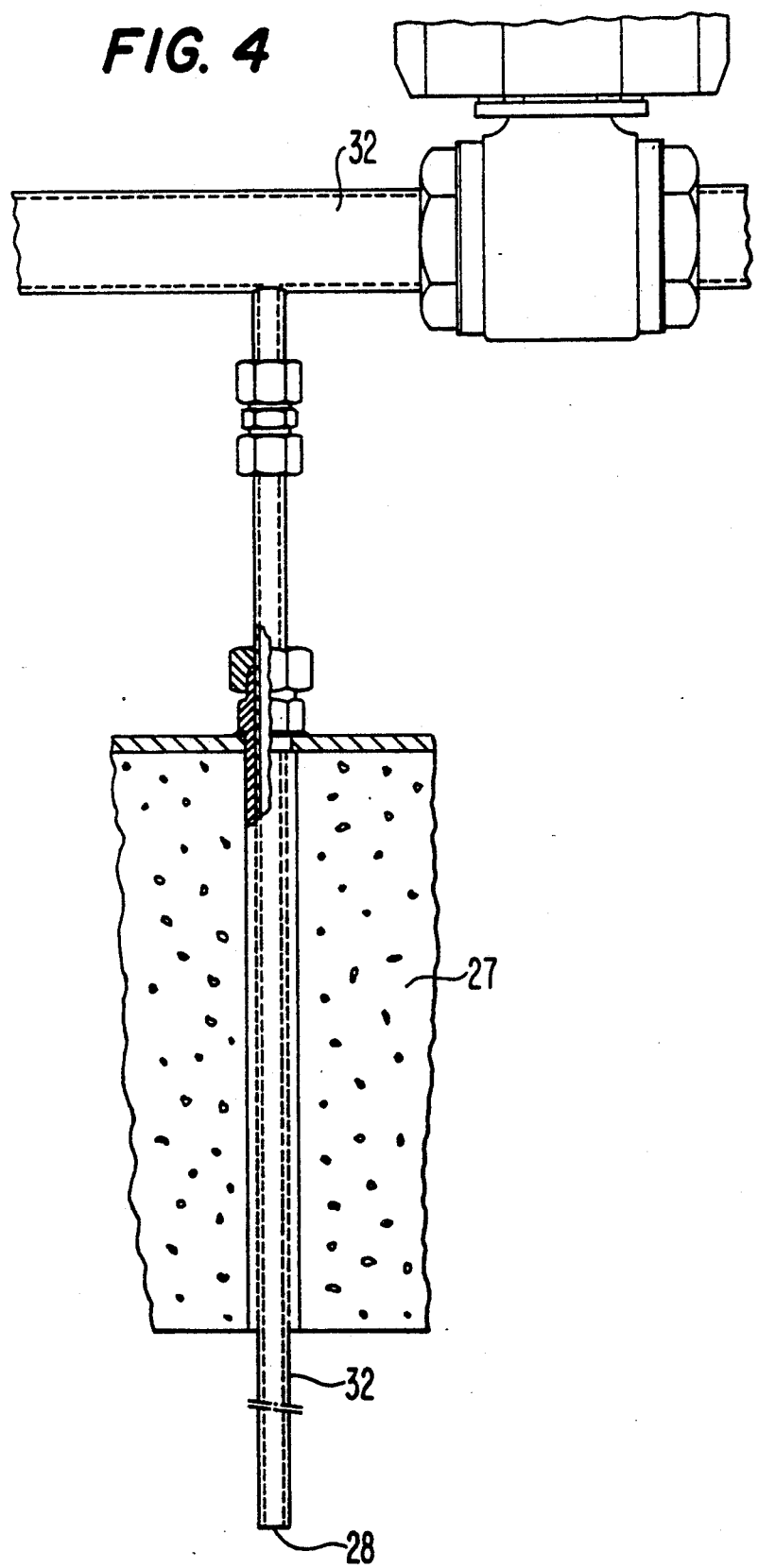
FIG. 4 is an enlarged representation of the blow-back device of FIG. 3.

Referring to FIGS. 2 to 4, the blow-back device 21 may be composed of several blow lances 22 which are inserted through cover 27 of filter 5, with one blow lance being associated with each filter element 8 or a holding opening 31. The blow opening 28 of these blow lances communicates with the respective outlet openings 29 of elements 8. Blow lances 22 are supplied with compressed air by way of a collecting pipe 32. Alternatively, one movable lance may be used in lieu of the plurality of lances 22.

Obviously, numerous and additional modifications and variations of the present invention are possible in light of the above teachings. It is therefore to be understood that within the scope of the appended claims, the invention may be practiced otherwise than as specifically described herein.

What is claimed is:

1. A process for removing flue gas cleaning residues in a combustion system, the combustion system including: a combustion chamber; a hot gas filter located downstream from the combustion chamber, the hot gas filter including an inlet chamber for receiving hot flue gases, an outlet chamber sapced from the inlet chamber, and filter elements held by a holding plate in an upright position located between the inlet chamber and the outlet chamber and containing outlet openings; washers located downstream from the hot gas filter for receiving filtered flue gas from the outlet chamber, the wahsers empolying a washing liquid for precipitating contaiminants in the flue gas, said process comprising steps of:

precipitating contaiminants present in the flue gas in the washing liquid;

neutralizing the washing liquid, thereby enriching the washing liquid with salts of the precipitated vontaminants;

spraying the enriched washing liquid into the inlet chamber, whereby the wahing liquidevaporates the salts contained in the washing liquid are dposited on the filter elements;

blowing compressed air by way of blow lances communicating with the outlet openings of the filter elements into the filter elements to release thed eposited salts from the filter elements, whereby the deposited salts drop into a lower portion of the inlet chamber; and removing the salts from the lower porton of the inlet chamber.

2. The process according to claim 1, further comprising the step of comminuting the removed salts.

3. The process according to claim 1, further comprising the steps of:

combining the comminuted salts with ashes from the combustion chamber; and shaping the combination of comminuted salts and ashes into packets.

4. An apparatus for removing flue gas cleaning residues in a combustion ystem, said aparatus comprising:

a hot gas filter, said hot gas filter including an inlet chamber, and an outlet camber, filter elements disposed between said inlet and outlet chambers and a holding plate for holding said filter elements upright, said filter elements including outlet openings;

means for introducing a flue gas containing contaiminats into said inlet chamber of said hot gas filter;

means for washing flue gas which exits said hot gas filter from said outlet chamber, said washing means including a washing liquid in which contaminants from said flue gas are precipitated;

means for neutralizing said washing liuid in which contaminants are precipitated, thereby enriching the wasing liquid with salts;

means for sprayng the salt enriched washing liquid into said inlet chamber, whereby the washing liquid evaporates and the salts contained in the washing liquid are depoisted on said filter elements and;

blow lances which communicate with said outlet openings, said blow lances being charged with compressed air for removing salts deposited on said filter elements.

5. The apparatus according to claim 4 wherein said sprayng means comprises a binary spray nozzle which projects into said inlet chamber below said filter elements.

6. The apparatus according to claim 4 further comprising means for comminuting the removed salts.

7. The appartus according to claim 6, further comprising:

means for combining the comminuted salts with ashes from the combustion chamber; and means for shaping the combination of comminuted salts and ashes into packets.

* * * * *